June 9, 1964    G. G. GLENN ETAL    3,136,884
HIGH EFFICIENCY AUTO-MODULATED WELDING ARC POWER SUPPLY
Filed April 17, 1961
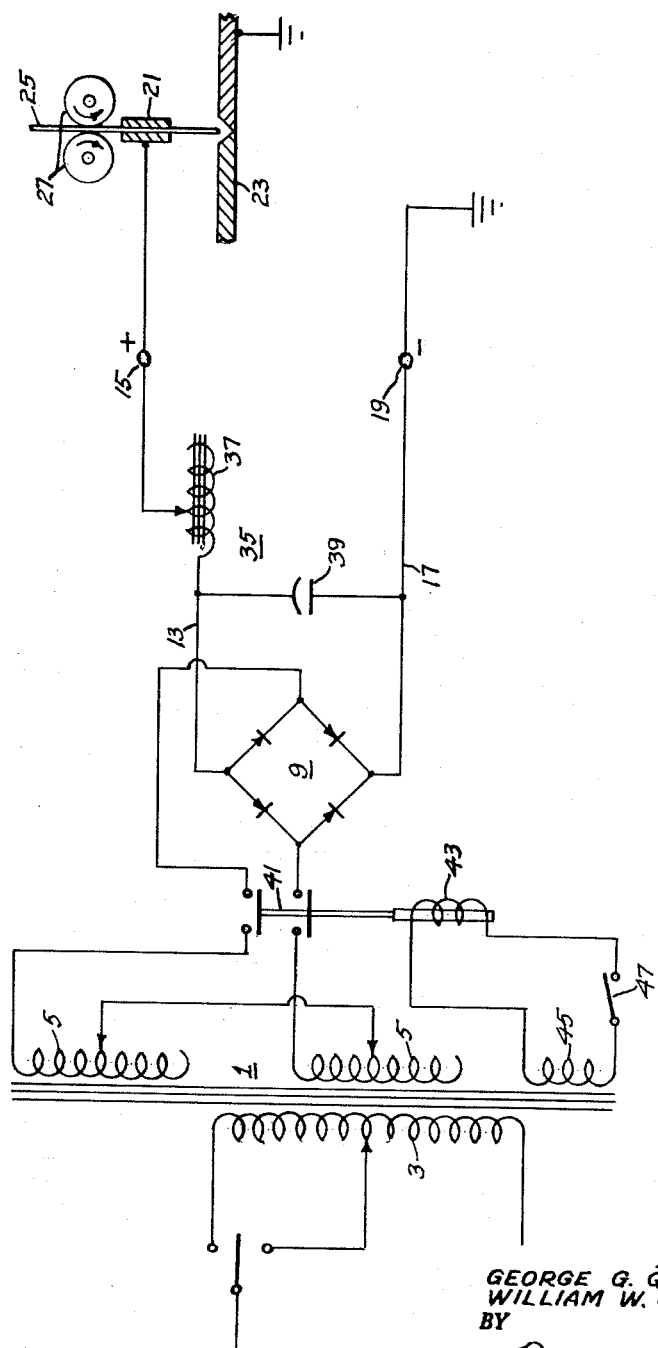
INVENTORS
GEORGE G. GLENN
WILLIAM W. GIBSON
BY
Bruce & Brosler
THEIR ATTORNEYS

3,136,884
HIGH EFFICIENCY AUTO-MODULATED WELDING ARC POWER SUPPLY
George G. Glenn, Oakland, and William W. Gibson, Alameda, Calif., assignors to Glenn Pacific Corporation, a corporation of California
Filed Apr. 17, 1961, Ser. No. 103,486
7 Claims. (Cl. 219—131)

Our invention relates to electric welding and more particularly to a power supply for welding.

The present invention is predicated upon our discovery that by modulating the direct current output of a constant voltage power supply as through the utilization of a tank circuit, improved arc welding characteristics may be obtained, to the extent that a single phase power supply circuit can be made to weld as good as, and in many instances, produce a better weld than a conventional three phase power supply, though the invention is not limited to such single phase application.

Among the objects of our invention are:
(1) To provide a novel and improved welding arc power supply;
(2) To provide a novel and improved welding arc power supply capable of use with single phase power;
(3) To provide a novel and improved single phase welding arc power supply capable of producing welds comparable to, and in many instances better, than a comparable conventional three phase power supply.

Additional objects of our invention will be brought out in the following description of a preferred embodiment of the same taken in conjunction with the accompanying drawing, wherein:

The figure is a circuit diagram depicting a power supply for a welding arc, utilizing the invention as applied to a single phase power source.

Referring to the drawings for details of our invention in its preferred form, the circuit comprises a source 1 of alternating current voltage which is adjustable to produce alternating current voltages within the range of conventional welding voltages of say from 7 to 50 volts. Such source of alternating current voltages may include a variable step down transformer having a primary winding 3 tapped for connection to power sources of different voltages to realize the desired range of welding voltages across a pair of secondary windings 5, which are also tapped to permit of selection of the desired voltage within such range.

The output of such secondary windings is connected across a full wave rectifier 9 preferably one utilizing rectifiers of the semi-conductor type, such as silicon rectifiers, to provide a rectified voltage of comparable value.

The positive side of the full wave rectifier is coupled by a connection 13 to a positive load terminal 15, while the negative side of the rectifier is similarly connected by a connection 17 to a negative load terminal 19, such terminals being provided for connection, one to an electrode 21, the other to the work 23 to be welded, or in other words across a welding arc.

The electrode 21 is one through which electrode wire 25 is fed at a constant rate by and between a pair of feed rolls 27.

Of major importance to the successful functioning of the power supply of the present invention, is the provision between the rectifier circuit and the load terminals, of a tank circuit 35 loaded with capacitance and tunable within a frequency range of the order of 20–60 cycles. Such tank circuit includes a variable reactor 37 in the connection 13 from the positive side of the rectifier to the positive load terminal and a large condenser 39 or bank of condensers, preferably of the electrolytic type, connected from the negative connection 17 to the positive connection, the latter being at a point between the rectifier circuit and the variable reactor.

The variable reactor 37 will have a range of the order of .1 to 2 millihenries, and may be of the tapped type, though we prefer it to be of the sliding contact type, and more particularly such as illustrated and described in the application of William W. Gibson for Welding System and Associated Adjustable Reactor, Serial No. 763,989, filed September 29, 1958.

The condenser may have a value within a range from 20,000 microfarads to 80,000 microfarads. A value which we have found to be very satisfactory when operating at a welding voltage of the order of 50 volts, was 60,000 microfarads.

In utilizing the power supply, the load terminals are connected to the electrode and the work and the power turned on, which may be provided for by running the connections to the full wave rectifier 9 through a solenoid operated switch 41 having a coil 43 connected across an auxiliary secondary winding 45 of the step down transformer, through a manually controlled switch 47.

Upon feeding of the welding wire 25 to the work 23 and establishing an arc, the tank circuit is then tuned until a smooth splatter free weld is realized. The aforementioned tuning range of the order of 20–60 cycles has been found to be adequate for this purpose.

The tank circuit, we have reason to believe, responds to the pulsations at the arc and introduces into the rectified current and voltage waves, an alternating current component which periodically crosses the zero axis and produces reverse pulsations of voltage and current, at a frequency controlled by the tuning of this circuit. It is further our belief that when the frequency of such pulsations approaches the dropulet frequency of the arc, under the prevailing conditions, a situation comparable to resonance develops, which causes the arc to function smoothly and produce the smooth and splatter free weld, characteristic of the present invention. From another viewpoint, the tank circuit is tuned to a frequency compatible with the rate of feed of the electrode wire, compatability being evidenced by resulting substantially smooth and splatter-free welding.

The invention is applicable to welding in general, but finds its major advantages in automatic or semi-automatic welding systems whether the welding current be small, of the order of 10 amperes, or large, of the order of 2000 amperes. Some change in the magnitude of the condenser 39 to realize maximum efficiency seems desirable with change in magnitude of welding current flowing in the circuit, e.g., an increase of the one with an increase of the other, though this is not critical. The ability to tune the tank circuit along the lines described is of major importance.

While we have described our invention in its preferred form as applied to single phase power, we contemplate its application to multi-phase power and accordingly do not desire to be limited to single phase use.

It will be apparent also that the preferred form, as illustrated and described, is subject to alteration and modification without departing from the underlying principles involved, and we accordingly do not desire to be limited in our protection to the specific details illustrated and described except as may be necessitated by the appended claims.

We claim:
1. A high efficiency auto-modulated welding arc power supply for automatic and semi-automatic welding, comprising a source of alternating current at substantially welding voltage, means for rectifying the output of said source of alternating current, a pair of load terminals for connection to a wire feed electrode and work to be welded, a connection from the positive side of said rectifier means to one of said load terminals, a connection from the negative side of said rectifier means to the other of said load terminals, both said connections being capable of carrying current of a value required to produce welding of metal, and electrical components in said power supply between said rectifier means and said load terminals adapted to establish a tank circuit during use of said power supply, said tank circuit including a variable reactor in one of said connections from said rectifier means, and condenser means having a capacity within a range of 20,000 to 80,000 microfarads connected between said connections from a point on the one to a point on the other located between said rectifier means and said variable reactor, said reactor and condenser means being of such values as to enable tuning of said tank circuit to frequencies within a range of 20—60 cycles, and said condenser means, when so connected, being adapted to accumulate and store substantial electrical energy, and in combination with said reactor, discharge energy as needed, into an arc to minimize the effects of undesired and otherwise uncontrollable fluctuations in such arc.

2. A high efficiency auto-modulated welding arc power supply for automatic and semi-automatic welding, comprising a source of alternating current at substantially welding voltage, said source including a step down transformer providing a secondary voltage within a welding range, means for rectifying the output of said step down transformer, a pair of load terminals for connection to a wire feed electrode and work to be welded, a connection from the positive side of said rectifier means to one of said load terminals, a connection from the negative side of said rectifier means to the other of said load terminals, both said connections being capable of carrying of a value required to produce welding of metal, and electrical components in said power supply between said rectifier means and said load terminals adapted to establish a tank circuit during use of said power supply, said tank circuit including a reactor of a value of the order of .1 to 2 millihenries in one of said connections from said rectifier means, and condenser means of a value of the order of 20,000 to 80,000 microfarads, connected between said connections from a point on the one to a point on the other located between said rectifier means and said reactor, said tank circuit being tunable in a frequency range of the order of 20–60 cycles, and said condenser means, when so connected, being adapted to accumulate and store substantial electrical energy, and in combination with said reactor, discharge energy as needed, into an arc to minimize the effects of undesired and otherwise uncontrollable fluctuations in such arc.

3. A high efficiency welding arc system comprising a source of alternating current at substantially welding voltage, means for rectifying the output of said source of alternating current, a pair of load terminals, a connection from the positive side of said rectifier means to one of said load terminals, a connection from the negative side of said rectifier means to the other of said load terminals, a wire feed electrode, means for feeding electrode wire to work through said wire feed electrode at a selected one of a range of feed rates, means for connecting one of said load terminals to said wire feed electrode, means for connecting the other of said load terminals to work to be welded to create an arc gap between said wire feed electrode and such work, a tank circuit following said rectifier means, said tank circuit including electrical storage condenser means and a reactor in series between said load terminals, said condenser means having a capacity within a range of 20,000 to 80,000 microfarads and said tank circuit being tunable to a frequency compatible with the selected rate of feed of said electrode wire during welding, said compatibility being evidenced by substantially smooth and splatter-free welding.

4. A high efficiency welding arc system comprising a source of alternating current at substantially welding voltage, means for rectifying the output of said source of alternating current, a pair of load terminals, a connection from the positive side of said rectifier means to one of said load terminals, a connection from the negative side of said rectifier means to the other of said load terminals, a wire feed electrode, means for feeding electrode wire to work through said wire feed electrode at a selected one of a range of feed rates, means for connecting one of said load terminals to said wire feed electrode, means for connecting the other of said load terminals to work to be welded to create an arc gap between said wire feed electrode and such work, a tank circuit following said rectifier means, said tank circuit including electrical storage condenser means and a reactor in series between said load terminals, said condenser means having a capacity within a range of 20,000 to 80,000 microfarads and said tank circuit being tunable within a frequency range of the order of 20 to 60 cycles to permit selection of a frequency compatible with the selected rate of feed of said electrode wire during welding, said compatibility being evidenced by substantially smooth and splatter-free welding.

5. A high efficiency welding arc system comprising a source of alternating current at substantially welding voltage, means for rectifying the output of said source of alternating current, a pair of load terminals, a connection from the positive side of said rectifier means to one of said load terminals, a connection from the negative side of said rectifier means to the other of said load terminals, a wire feed electrode, means for feeding electrode wire to work through said wire feed electrode at a selected one of a range of feed rates, means for connecting one of said load terminals to said wire feed electrode, means for connecting the other of said load terminals to work to be welded to create an arc gap between said wire feed electrode and such work, a tank circuit following said rectifier means, said tank circuit including a capacitance of the order of 20,000 to 80,000 microfarads in series with an inductance of the order of .1 to 2 millihenries between said load terminals.

6. A high efficiency auto-modulated welding arc power supply comprising a source of alternating current at substantially welding voltage, means for rectifying the output of said source of alternating current, a pair of load terminals for connection to an electrode and work to be welded, a connection from the positive side of said rectifier means to one of said load terminals, a connection from the negative side of said rectifier means to the other of said load terminals, both said connections being capable of carrying current of a value required to produce welding of metal, a reactor in one of said connections from said rectifier means, and condenser means having a capacity within a range of 20,000 to 80,000 microfarads connected between said connections from a point on the one to a point on the other located between said rectifier means and said reactor, and adapted to store electrical energy, and in combination with said reactor discharge energy into an arc to minimize the effects of undesired and otherwise uncontrollable fluctuations in such arc.

7. A high efficiency auto-modulated welding arc power supply comprising a source of alternating current at substantially welding voltage, said source including a step down transformer providing a secondary voltage within a welding range, means for rectifying the output of said step down transformer, a pair of load terminals for connection to an electrode and work to be welded, a connection from the positive side of said rectifier means to one of said load terminals, a connection from the negative side of said rectifier means to the other of said load terminals, both said connections being capable of carrying current of a value required to produce welding of metal, a variable reactor in one of said connections from said rectifier means, and condenser means having a capacity within a range of 20,000 to 80,000 microfarads connected between said connections from a point on the one to a point on the other located between said rectifier means and said variable reactor, and adapted to store electrical energy, and in combination with said reactor, discharge energy into an arc to minimize the effects of undesired and otherwise uncontrollable fluctuations in such arc.

References Cited in the file of this patent
UNITED STATES PATENTS

| | | |
|---|---|---|
| 1,972,529 | Longoria | Sept. 4, 1934 |
| 2,255,141 | Weir | Sept. 9, 1941 |
| 3,025,388 | Turbitt | Mar. 13, 1962 |
| 3,054,884 | Manz et al. | Sept. 18, 1962 |
| 3,078,362 | Steinert | Feb. 19, 1963 |